June 8, 1926.
P. O. DALLMANN
BELT PULLEY CLUTCH CONTROL
Filed May 8, 1925
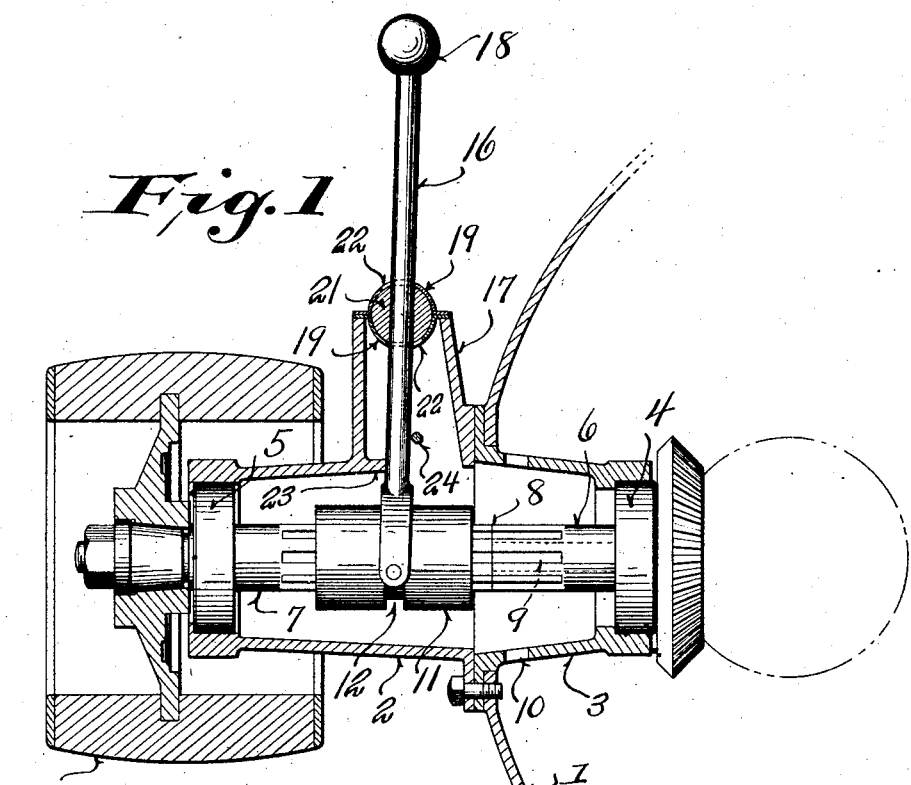
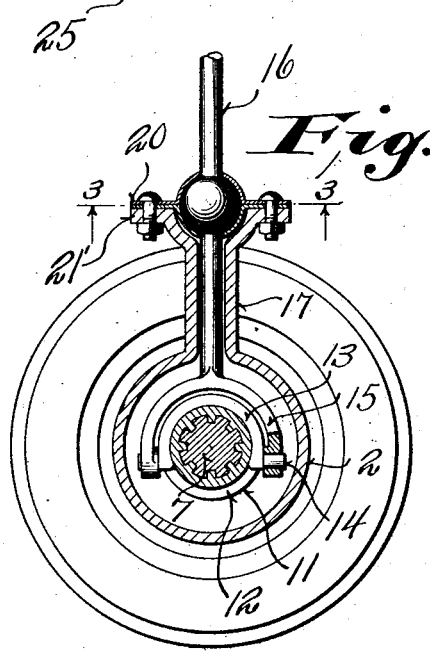
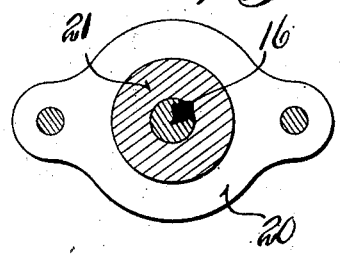
Inventor
Paul O. Dallmann
Young & Young
Attorneys Patented June 8, 1926.

1,588,013

UNITED STATES PATENT OFFICE.

PAUL O. DALLMANN, OF MILWAUKEE, WISCONSIN, ASSIGNOR TO DALLMANN MACHINE & MFG. CO., OF MILWAUKEE, WISCONSIN.

BELT-PULLEY CLUTCH CONTROL.

Application filed May 8, 1925. Serial No. 28,890.

This invention relates to a clutch control device and is particularly directed to means for sealing the joint between the manually operable lever and the housing for the clutch mechanism.

This invention is an improvement over that disclosed in United States patent to Mueller et al., 1,546,857, July 21, 1925, for belt pulley clutch control for tractors, in which I am the joint applicant.

In devices of this nature where they are operated in dusty places, it is a common occurrence for grit to find its way into the mechanism particularly through the opening through which the hand lever passes.

In view of the fact that the housing communicates directly with a large portion of the mechanism of the tractor it is imperative to prevent the entrance of grit, dirt or other foreign material.

Objects of this invention are, therefore, to provide a movable joint between the hand lever for controlling the clutch mechanism and the housing for the clutch mechanism so that in all positions of the hand lever entrance of grit and other detrimental matter will be prevented.

Further objects are to provide a construction which may be manufactured at a very low figure, and which may be very quickly assembled without requiring elaborate alterations in the construction of the housing or associated mechanism.

An embodiment of the invention is shown in the accompanying drawings, in which:—

Figure 1 is a vertical sectional view through the clutch mechanism.

Figure 2 is a transverse view through the structure shown in Figure 1, approximately on the line 2—2 of Figure 1.

Figure 3 is an enlarged sectional view on the line 3—3 of Figure 2.

Referring to the drawings it will be seen that the main tractor housing is indicated at 1 and that an auxiliary housing composed of the parts 2 and 3 is bolted thereto in the manner shown and set forth in detail in the above noted copending application. This housing carries roller bearings 4 and 5 which in turn carry the driving shaft 6 and the driven pulley shaft 7, such shafts having splined juxtaposed ends which meet approximately on the line indicated at 8 in Figure 1. In order to support the shafts in correct axial alignment the driven shaft 7 is provided with a projection shown in dotted lines at 9 which extends into the driving shaft 6 in accordance with the disclosure in the copending application.

It is to be noted that the housing 3 is provided with apertures 10 which permit the free circulation of oil.

A slidable collar 11 is loosely splined to the shafts 6 and 7 and is adapted to be slipped over their juxtaposed ends to operatively connect the shafts. It is provided with a groove 12 which carries a spring collar 13. This collar, as will be seen from Figure 2, extends over slightly more than a semi-circumference and is resilient enough to permit its being snapped into place and thereafter retained due to the overhanging lower ends thereof. The collar is provided with outwardly projecting trunnions 14 which are engaged by the forked ends 15 of a manually operable shift lever 16. This shift lever projects through a laterally extending portion 17 of the housing 2 and projects through the open end of such projection, the extreme end of the lever being provided with any suitable type of hand grip such as the knob 18. In order to prevent entrance of grit into the mechanism enclosed by the several housings and in all positions of the lever 16 to seal the open end of the projection 17, a pair of stampings are provided which have hemispherical portions 19. These stampings are provided with outwardly projecting flanges 20 (see Figure 3) which are bolted, as shown in Figure 2, to a corresponding flange 21′ of the laterally extending projection 17 of the casing 2. The stampings together form a complete spherical recess within which is socketed a ball 21. This ball is provided with a diametrically extending aperture through which the lever 16 slides.

It is to be noted particularly from Figure 1 that the stampings are provided with slots 22 which permit the rocking motion of the lever 16.

If desired, a suitable stop 23 and lock pin 24 may be provided to lock the lever in inoperative position, as disclosed in the above noted patent as it frequently happens that the pulley 25 remains idle during long periods.

It is to be particularly noted that an extremely simple means has been provided for securely sealing the operating lever 16 with reference to the projecting portion 17 of the housing and that this sealing means consisting jointly of the ball and spherically recessed stampings permits the use of the peculiar type of spring collar 13, thus greatly cheapening the construction and also insuring against entrance of grit. It is to be noted that when such a collar is used and is provided with trunnions and connected with the shift lever 16, as shown, that the shift lever must necessarily slide up and down to a slight extent during the shifting motion of the collar 11. This is very readily accomplished by the ball and socket joint formed by the sphere and stampings described in detail above.

It will, therefore, be seen that a very cheaply manufactured clutch control mechanism for the belt pulleys of tractors has been provided and that this construction insures the complete sealing of the housing for the mechanism in all positions of the shift lever.

Although the invention has been described in considerable detail, it is to be understood that the invention may be variously embodied and is, therefore, to be limited only as claimed.

I claim:

In a clutch control device, the combination of clutch mechanism having a slidable sleeve, a housing enclosing said clutch mechanism and having a laterally projecting portion provided with an open end, a pair of spherically recessed stampings closing the said open end, a spherical ball carried within the recesses of said stampings and having an aperture extending diametrically therethrough, and a lever slidably passing through the aperture in said ball and operatively connected to said sleeve.

In testimony that I claim the foregoing I have hereunto set my hand at Milwaukee, in the county of Milwaukee and State of Wisconsin.

PAUL O. DALLMANN.